United States Patent

Christiansen et al.

(10) Patent No.: US 8,155,836 B2
(45) Date of Patent: Apr. 10, 2012

(54) SYSTEM AND METHOD FOR ELECTRONICALLY POWER ASSISTED STEERING

(75) Inventors: Jens F. Christiansen, Whitmore Lake, MI (US); Michael J. Kipley, Saline, MI (US); Brad G. Hochrein, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1084 days.

(21) Appl. No.: 12/018,277

(22) Filed: Jan. 23, 2008

(65) Prior Publication Data

US 2009/0187311 A1 Jul. 23, 2009

(51) Int. Cl.
*B62D 5/04* (2006.01)
*B62D 3/12* (2006.01)

(52) U.S. Cl. ............... 701/41; 180/446; 180/428

(58) Field of Classification Search .......... 701/42
See application file for complete search history.

(56) References Cited

U.S. PATENT DOCUMENTS

| | | | | |
|---|---|---|---|---|
| 4,028,957 | A * | 6/1977 | Wright | 74/422 |
| 6,370,459 | B1 * | 4/2002 | Phillips | 701/41 |
| 6,588,770 | B1 * | 7/2003 | Lee | 280/5.52 |
| 6,631,782 | B1 | 10/2003 | Rieger | |
| 6,691,819 | B2 | 2/2004 | Menjak et al. | |
| 6,832,144 | B2 | 12/2004 | Momiyama et al. | |
| 6,843,344 | B2 | 1/2005 | Kodama et al. | |
| 6,915,194 | B2 | 7/2005 | Kodama et al. | |
| 7,073,622 | B2 | 7/2006 | Turner et al. | |
| 7,954,593 | B2 * | 6/2011 | Dornhege et al. | 180/446 |
| 8,010,254 | B2 * | 8/2011 | Chai et al. | 701/42 |
| 2002/0195293 | A1 * | 12/2002 | Will | 180/445 |
| 2005/0279562 | A1 * | 12/2005 | Hara et al. | 180/402 |
| 2006/0011404 | A1 | 1/2006 | Goto et al. | |
| 2007/0175695 | A1 * | 8/2007 | Bishop et al. | 180/444 |
| 2007/0216125 | A1 | 9/2007 | Baxter | |
| 2008/0162001 | A1 * | 7/2008 | Chai et al. | 701/42 |
| 2009/0078494 | A1 * | 3/2009 | Dornhege et al. | 180/446 |

FOREIGN PATENT DOCUMENTS

| | | |
|---|---|---|
| DE | 199 63 871 A1 | 1/2001 |
| DE | 102 21 721 A1 | 11/2003 |
| DE | 10 2005 038 390 A1 | 6/2006 |

OTHER PUBLICATIONS

Office Action issued in corresponding German application, 10 2009 005 618.1-21, having a mailing date of Mar. 30, 2010.

* cited by examiner

*Primary Examiner* — Shelley Chen
(74) *Attorney, Agent, or Firm* — O'Brien Jones PLLC; Frederick Owens

(57) ABSTRACT

A system and method for controlling a vehicle steering system, comprising receiving at least one signal corresponding to one or more of a lateral acceleration, a longitudinal acceleration, a vertical acceleration, a suspension travel, and a vehicle speed, calculating or determining an optimum steering rack travel from the at least one signal, and limiting travel of a steering rack of the vehicle based on the optimum steering rack travel.

12 Claims, 2 Drawing Sheets

SYSTEM AND METHOD FOR ELECTRONICALLY POWER ASSISTED STEERING

DESCRIPTION OF THE INVENTION

1. Field of the Invention

The present invention relates generally to an electronically power assisted steering (EPAS) that provides vehicle signal affected software-based travel restriction in an EPAS gear.

2. Background of the Invention

Vehicle power assisted steering systems typically use permanent, hardware-based systems to mechanically limit steering rack travel. These systems add weight and cost to the vehicle. Because a hardware-based system is permanent, the steering rack travel is fixed. In addition, different hardware can be required for each vehicle due to different wheel diameters and vehicle dimensions.

The recent development of electronically/electrically/electric power assisted steering (EPAS) provides several advantages over conventional power assisted systems. EPAS systems reduce weight and consume less power. Unlike hydraulic power assisted steering systems which continuously use power, the electronic motor used by an EPAS system is only used when needed during steering maneuvers. Due to lower power consumption, EPAS systems may prove more economical in use.

Existing power assisted steering systems typically use a single steering rack travel limit, i.e., the degree that the wheel may turn is fixed. The limiter is designed to prevent the tire from contacting the wheel well of the vehicle. To prevent the tire from contacting the wheel well using a single limiter, the limiter is positioned based on the most adverse conditions the vehicle may encounter. Conditions which limit the steering rack travel include suspension travel (e.g., jounce and rebound), speed of the vehicle, relative wheel speed, and lateral acceleration forces. Due to accommodation of these conditions, power assisted steering systems limit the vehicle to a larger than necessary turning radius because they are based on the most extreme possible operating conditions.

To increase driver satisfaction, it is desirable to reduce a vehicle's turning radius during low speed maneuvers. For example, when driving at low speed in a parking lot, a smaller turning radius is desirable.

SUMMARY OF THE INVENTION

In accordance with certain embodiments of the present teachings, the present invention provides a power assisted steering system comprising at least one sensor and a system controller configured to receive signals from the at least one sensor corresponding to at least one of a lateral acceleration, a longitudinal acceleration, a vertical acceleration, a suspension travel, and a vehicle speed.

In accordance with certain embodiments of the present teachings, the present invention provides a method for controlling a power assisted steering system of a vehicle. The method comprises receiving at least one signal corresponding to one or more of a lateral acceleration, a longitudinal acceleration, a vertical acceleration, a suspension travel, and a vehicle speed, calculating an optimum steering rack travel from the at least one signal, and limiting travel of a steering rack of the vehicle based on the optimum steering rack travel.

In accordance with certain embodiments of the present teachings, the present invention provides a method for controlling a power assisted steering system of a vehicle. The method comprises calculating or determining a permissible steering rack travel for a vehicle based on at least a vehicle speed, allowing unimpeded steering within the permissible steering rack travel, providing counter assist torque to prohibit movement of a steering rack of the vehicle beyond the permissible steering rack travel and providing counter assist torque to return the steering rack of the vehicle to a position within the permissible steering rack travel when a steering rack position of the vehicle is beyond the permissible steering rack travel.

Additional objects and advantages of the invention will be set forth in part in the description which follows, and in part will be obvious from the description, or may be learned by practice of the invention. At least some of the objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain certain principles.

BRIEF DESCRIPTION OF THE DRAWINGS

At least some features and advantages of the present teachings will be apparent from the following detailed description of embodiments consistent therewith, which description should be considered with reference to the accompanying drawings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF VARIOUS EXEMPLARY EMBODIMENTS

Reference will now be made to various embodiments, examples of which are illustrated in the accompanying drawings. However, these various exemplary embodiments are not intended to limit the disclosure. To the contrary, the disclosure is intended to cover alternatives, modifications, and equivalents.

Addition of a sensor-based controller of an EPAS system can allow for adjustments of allowable steering rack travel while the vehicle is in motion. Adjusting the limits of steering rack travel while the vehicle is in motion can improve the driving experience by optimizing a turning radius of the vehicle based on suspension travel and vehicle acceleration.

Figure 1:
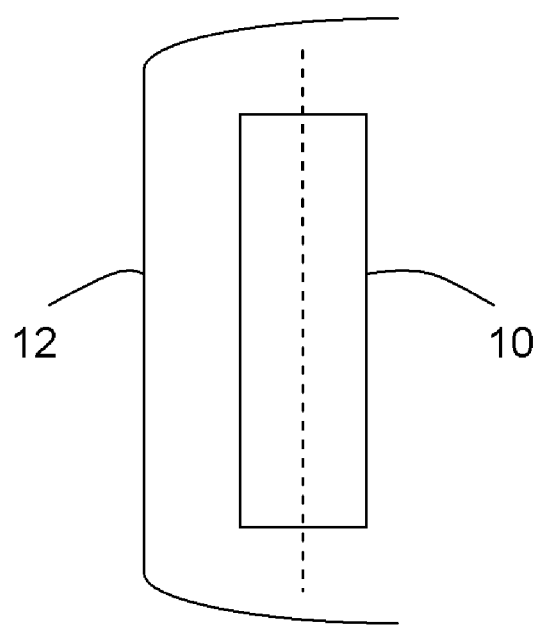
FIG. 1 is a top view of a vehicle wheel in an unturned position.

FIG. 1 shows a top view of a wheel 10 in an equilibrium position within a wheel well 12. In this position, wheel 10 is not turned and the distance between wheel 10 and wheel well 12 is at a maximum.

Figures 2A, 2B:
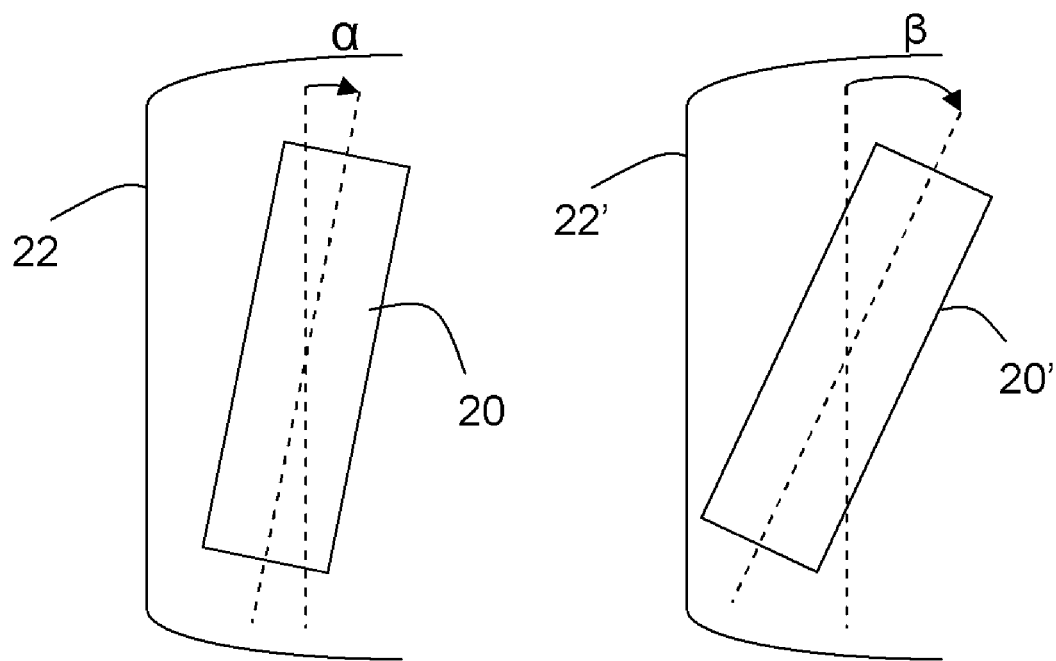
FIG. 2A is a top view of a vehicle wheel turned to an angle α.
FIG. 2B is a top view of a vehicle wheel turned to an angle β.

At high speeds, suspension travel is pronounced because the suspension cannot react as quickly as bumps are encountered. Thus, suspension travel caused by jounce and rebound is at a maximum. Due to the geometry of a vehicle's wheel well, steering rack travel may have to be limited during suspension travel to avoid contact between the tire and the vehicle. FIG. 2A depicts wheel 20 at a maximum or optimum steering rack travel angle α during high speeds and large suspension travel. The maximum or optimum steering rack travel angle α prevents wheel 20 from contacting wheel well 22.

At slow speeds, suspension travel is typically at a minimum. Jounce and rebound can be readily absorbed by the suspension system because of the slow vehicle speeds and it is therefore less likely that the tire will contact the wheel well of the vehicle. FIG. 2B shows wheel 20' at a maximum or optimum steering rack travel angle β. Because the suspension is capable of absorbing jounce and rebound better at slower speeds, wheel 20' is able to turn at angle β, which is greater than angle α as shown in FIG. 2A, and more closely approach the sides of wheel well 22'. Enabling the steering rack travel to turn to angle β allows the vehicle to exhibit a smaller turning radius than angle α allows. This smaller turning radius may allow for greater maneuverability in tight places, such as, for example, parking lots.

To enable the angle of the steering rack travel to be dynamically controlled, various exemplary embodiments of the present teachings contemplate using one or more sensors to provide control signals to an EPAS system controller, allowing it to determine or calculate a permissible limit for the vehicle's steering rack travel. The one or more sensors may include existing vehicle sensors when available, such as, for example, wheel speed sensor(s) or engine rpm and transmission ratio, steering angle, longitudinal acceleration, lateral acceleration, suspension travel, or a combination thereof. Because most existing vehicles do not have an existing suspension travel sensor, certain embodiments of the present invention contemplate a system including such a sensor. Indeed, embodiments of the present invention contemplate a system including sensors as needed to provide the signal inputs used in the system and method of the present teachings.

In certain embodiments of the present teachings, at least one sensor detects the current operating conditions of the vehicle. Operating conditions of the vehicle that can be used to determine the maximum or optimum steering rack travel can include the speed of the vehicle, acceleration in the lateral, longitudinal, and vertical directions, suspension travel, and relative wheel speeds. For example, at higher vehicle speeds, an EPAS system controller in accordance with the present teachings can limit the steering rack travel to a narrower range of travel. At slower vehicle speeds, an EPAS system controller in accordance with the present teachings can allow the steering rack to have a greater range of travel. The present teachings further contemplate the maximum steering rack travel to be predetermined for a vehicle or application, and the EPAS system controller being used to determine only the optimum steering rack travel which can differ from the maximum steering rack travel, for example at high speeds or on bumpy roads. Alternatively, the EPAS system controller can be used to determine the maximum and the optimum steering rack travel.

In certain embodiments of the present teachings, the sensor(s) can detect acceleration of the vehicle in the lateral, longitudinal, and vertical directions. If the sensor(s) detect that the vehicle is accelerating in a longitudinal direction, the EPAS system controller can limit steering rack travel in anticipation of possible suspension travel. Likewise, if the vehicle is engaged in a turn, the sensor(s) may detect lateral acceleration that can cause the vehicle to lean, resulting in suspension travel. For a given lateral acceleration $A_y$, each vehicle generally has its own roll stiffness measured in degrees/g. When turning left, a right side of the vehicle compresses into jounce while the left side stretches into rebound to an extent at least partially in accordance with the vehicle's roll stiffness. Jounce and rebound are both forms of suspension travel. The greater the lateral acceleration, the greater the lean, and the farther into jounce/rebound the vehicle goes. Thus, certain embodiments of the present teachings contemplate limiting steering rack travel to a greater extent at greater lateral accelerations to accommodate vehicle jounce and rebound. Thus, in response to leaning, the EPAS system controller can limit the steering rack travel.

The sensor(s) may also detect vertical acceleration. When the vehicle experiences g-forces as a result of reaching a bottom of an incline, the EPAS system controller may limit steering rack travel due to compression of the suspension, another form of suspension travel.

In various embodiments of the present teachings, a sensor of the present system can detect suspension travel and use such a measurement to adjust the degree of steering rack travel allowed. When a vehicle is traveling along a smooth, horizontal surface, suspension travel can be at a minimum. In such conditions, the EPAS system controller can allow for greater steering rack travel. However, if the vehicle is traversing an unpaved road or encounters a road having another uneven surface, for example a road having potholes, the EPAS system controller can limit the degree of steering rack travel.

Figure 3:
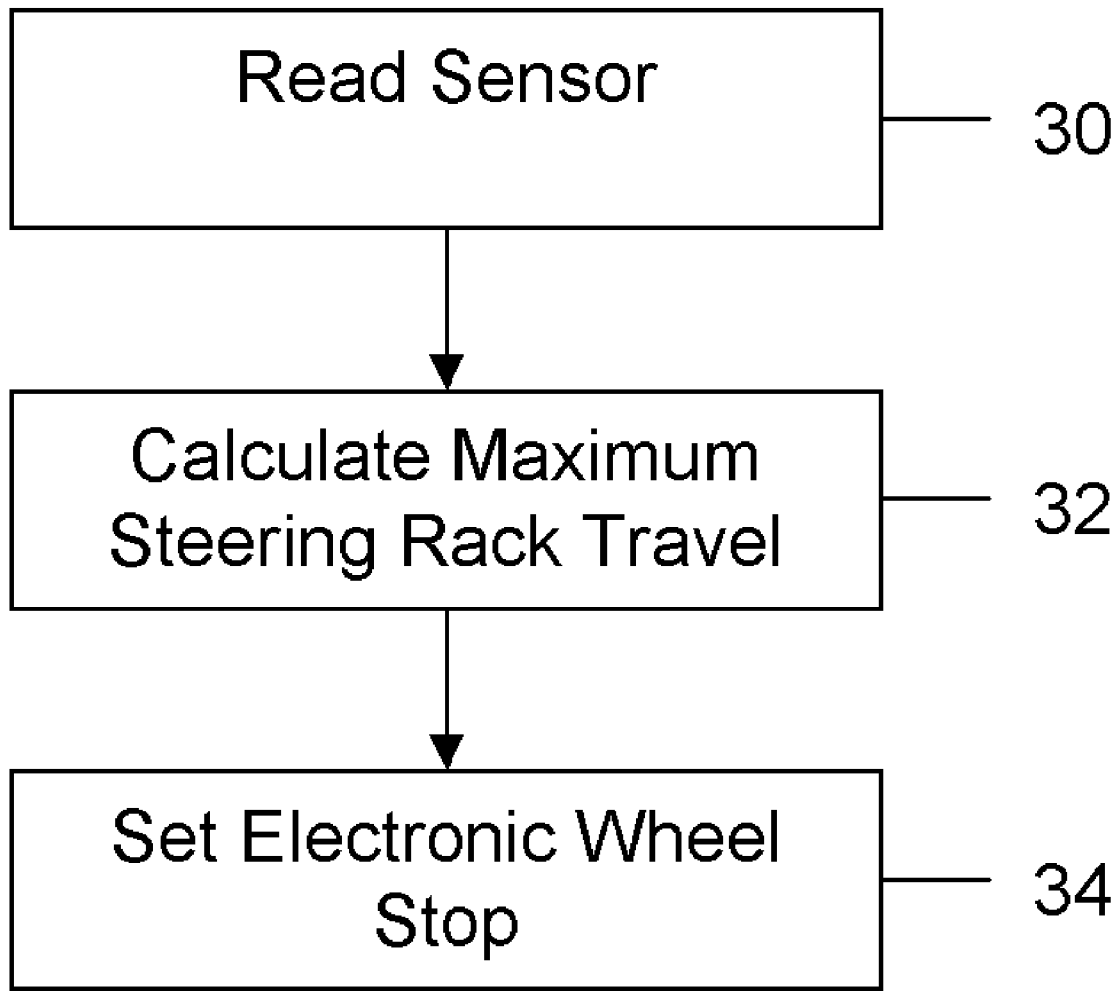
FIG. 3 is a flowchart of an embodiment of a dynamically controlled EPAS sensor system in accordance with the present teachings.

FIG. 3 shows a high-level flowchart depicting a sensor-based determination of a steering rack travel limit in accordance with various exemplary embodiments of the present teachings. In step 30, one or more sensors detect operating conditions of a vehicle, such as, for example, suspension travel, acceleration(s), and wheel speeds. Signals from the one or more sensors are sent to the EPAS system in step 32, where the EPAS system controller determines or calculates a maximum or optimum steering rack travel based on the current operating conditions. For example, in one exemplary determination or calculation, if a vehicle speed is less than a certain predetermined speed, the permissible steering rack travel can be set to a maximum or optimum steering rack travel. If the vehicle speed is equal to or greater than a certain predetermined speed, the permissible steering rack travel can be set to a value equal to the maximum or optimum steering rack travel minus a travel reduction which can be, for example about 5 millimeters. It is to be understood that the travel reduction can vary by vehicle and by application. As another example, wheel speed sensor input signals can be used to calculate a permissible steering rack travel, for instance by taking a maximum or optimum steering rack travel and subtracting therefrom an amount obtained by dividing a maximum of the right and left suspension travel amounts by a maximum or optimum steering rack travel amount multiplied by a travel reduction based on vehicle speed. As stated above, the travel reduction can be, for example, about 5 millimeters.

In step 34, the EPAS system controller "sets" an electronic wheel stop in accordance with a permissible steering rack travel. In various embodiments of the present teachings, the EPAS system opposes the driver exceeding a determined permissible steering rack travel. If the vehicle's steering position is within the permissible steering rack travel boundary, the system can allow unimpeded steering. If the steering position has reached the permissible steering rack travel boundary and a driver of the vehicle adds torque in an attempt to steer past the permissible steering rack travel boundary, the system can provide a counter assist torque, for example from the motor, to prohibit steering past the permissible steering rack travel boundary. If the steering position exceeds the permissible steering rack travel boundary, the system can provide a counter assist torque (e.g., according to a smoothed ramp function) to push the vehicle's steering rack back to the permissible travel boundary.

In accordance with certain embodiments of the present invention, as stated above, when the EPAS system determines that an electronic wheel stop should be set at a position already exceeded by the driver, such as, for example, when the driver accelerates while already engaged in a turn, the EPAS system can provide feedback to the driver, such as, for example, through the steering wheel in the form of increased steering wheel torque. Thus, if the vehicle's steering rack travel is already in a position that the EPAS system controller determines exceeds the permissible steering rack travel for given conditions, the system may provide feedback until the driver decreases the amount of steering rack travel to fall within the permissible range of travel.

While the present invention has been disclosed in terms of exemplary embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A power assisted steering system, comprising:
   at least two sensors; and
   a system controller configured to receive at least two signals from the at least two sensors, each of the signals corresponding to at least one of a lateral acceleration, a longitudinal acceleration, a vertical acceleration, a suspension travel, and a vehicle speed to determine an optimal steering rack travel, wherein the optimal steering rack travel is determined at least by the vehicle speed and the suspension travel.

2. The power assisted steering system of claim 1, wherein the controller is configured to dynamically determine an optimum steering rack travel based on the at least one signal received from the at least one sensor.

3. The power assisted steering system of claim 2, wherein the controller is configured to limit steering rack travel based on the determined optimum steering rack travel.

4. The power assisted steering system of claim 3, wherein the controller is configured to provide a feedback to a vehicle driver when a current steering rack travel exceeds the determined optimum steering rack travel.

5. The power assisted steering system of claim 4, wherein the feedback to the vehicle driver is torque feedback.

6. The method of claim 5, wherein the torque feedback is a counter assist torque supplied by a motor of the vehicle.

7. A method for controlling a power assisted steering system of a vehicle, comprising:
   receiving at least two signals, each of the signals corresponding to one or more of a lateral acceleration, a longitudinal acceleration, a vertical acceleration, a suspension travel, and a vehicle speed;
   calculating or determining an optimum steering rack travel from the at least two signals, wherein the optimal steering rack travel is determined at least by the vehicle speed and the suspension travel; and
   limiting travel of a steering rack of the vehicle based on the optimum steering rack travel.

8. The method according to claim 7, further comprising providing feedback when travel of the vehicle steering rack exceeds the calculated optimum steering rack travel.

9. The method according to claim 8, wherein providing feedback comprises providing a torque feedback to a vehicle driver.

10. The method of claim 9, wherein the torque feedback is a counter assist torque supplied by a motor of the vehicle.

11. The method according to claim 7, wherein the optimum steering rack travel is calculated from signals corresponding to the suspension travel and the vehicle speed.

12. The method according to claim 7, wherein the optimum steering rack travel is calculated from signals corresponding to the lateral acceleration, the longitudinal acceleration, the vertical acceleration, the suspension travel, and the vehicle speed.

* * * * *